United States Patent
Coe et al.

(10) Patent No.: US 6,510,733 B2
(45) Date of Patent: Jan. 28, 2003

(54) TIRE TESTING MACHINE

(75) Inventors: Scott J. Coe, Akron, OH (US); David A. Kienholz, Mountain View, CA (US)

(73) Assignee: Bridgestone/Firestone North American Tire, LLC, Nashville, TN (US)

( * ) Notice: Subject to any disclaimer, the term of this patent is extended or adjusted under 35 U.S.C. 154(b) by 0 days.

(21) Appl. No.: 09/944,728

(22) Filed: Aug. 31, 2001

(65) Prior Publication Data

US 2002/0083762 A1 Jul. 4, 2002

(Under 37 CFR 1.47)

Related U.S. Application Data

(60) Provisional application No. 60/242,629, filed on Oct. 23, 2000.

(51) Int. Cl.⁷ .......................... E01C 23/00; G01M 17/02
(52) U.S. Cl. ........................................................ 73/146
(58) Field of Search ................................ 73/146–146.8; 152/209, 526; 157/13, 14; 356/71

(56) References Cited

U.S. PATENT DOCUMENTS

| | | |
|---|---|---|
| 3,797,306 A | 3/1974 | Petersen et al. |
| 4,160,378 A | 7/1979 | Himmler |
| 4,238,954 A | 12/1980 | Langer |
| 4,359,896 A | 11/1982 | Brown, Jr. et al. |
| 4,499,759 A | 2/1985 | Hull |
| 4,856,324 A | 8/1989 | Potts |
| 4,953,392 A | 9/1990 | Barson |
| 5,003,819 A | 4/1991 | Koopmann |
| 5,014,551 A | 5/1991 | Beebe et al. |
| 5,088,321 A | 2/1992 | Kajikawa et al. |
| 5,635,623 A | 6/1997 | Simon |
| 5,750,890 A | 5/1998 | Fricke et al. |
| 6,083,268 A * | 7/2000 | Kelsey et al. ................. 703/7 |

FOREIGN PATENT DOCUMENTS

DE 197 36 769 C 1 10/1998 .......... G01M/17/02

* cited by examiner

Primary Examiner—William Oen
Assistant Examiner—Marissa Ferguson
(74) Attorney, Agent, or Firm—John M. Vasuta; Mike Sand

(57) ABSTRACT

A tire testing machine (10) comprising a movable simulated road surface (14), an axle (16) including a bearing surface (22) around which a tire/wheel assembly (T) can rotate; and a frame (18) which supports the axle (16) in a non-rotatable but vertically floatable manner relative to the simulated road surface (14) whereby the tire/wheel assembly (T) can be loaded in rolling engagement against the simulated road surface (14). The frame (18) comprises tie members (26) which extend from the axle (16) to a stationary support (28) in a geometrically sturdy (e.g., triangular) arrangement and non-damping piston members (30) which are interposed between the tie members (26) and the stationary support (28). The geometrically sturdy arrangement of the tie members (26) can be an isosceles triangular arrangement and the simulated road surface (14) can comprise the outer circumferential surface of a road wheel (20).

18 Claims, 2 Drawing Sheets

TIRE TESTING MACHINE

RELATED APPLICATIONS

This application claims priority under 35 U.S.C. §119(e) to U.S. Provisional Application No. 60/242,629 filed on Oct. 23, 2000. The entire disclosure of this provisional application is hereby incorporated by reference.

FIELD OF THE INVENTION

This invention relates generally as indicated to a tire testing machine and, more particularly having a zero stiffness arrangement for loading a tire/wheel assembly onto a simulated road surface.

BACKGROUND OF THE INVENTION

To predict, correct or otherwise test the performance of a vehicle, it is common in the tire manufacturing arts to formulate a complete vehicle dynamic model. Because the tire/wheel assembly is the only connection between a vehicle and a road, a tire/wheel assembly can strongly influence the dynamics of the whole vehicle system. Accordingly, it is important to know natural frequencies, mode shapes and modal damping of the tire/wheel assembly that will be used on a vehicle for verification purposes, such as the verification of Finite Element Analysis models. To this end, the tire/wheel assembly will usually be tested independently of the rest of the vehicle model to obtain the necessary verification.

Since non-rotating and rotating tires have different dynamic properties, a tire testing machine is usually used during testing procedures. Such a tire testing machine can comprise, for example, a movable simulated road surface, an axle including a bearing surface around which a tire/wheel assembly can rotate, and a frame which loads the tire/wheel assembly into rolling engagement with the simulated road surface. The simulated road surface can reside on, for example, the outer circumferential surface of a wheel. In that manner, one can test a tire rolling on a simulated road surface in an otherwise stationary tire testing machine.

SUMMARY OF THE INVENTION

What the art needs is a tire testing machine that minimizes variables of simulation to permit Finite Element Analysis and other verifications to be conducted in a manner that essentially duplicates the real tire/wheel assembly on an actual vehicle on an actual road surface.

More particularly, what the art needs is a tire testing machine which allows testing of a tire under with zero stiffness boundary conditions relative to the simulated road surface. Without zero stiffness boundary conditions, the contributions of the machine to measured frequencies must be accounted for in order to determine the natural frequency of the tire. Such accounting is difficult to do in an accurate manner, especially when low frequency (under 20 HZ) models are being developed. A zero stiffness boundary condition can be easily and accurately modeled in Finite Element Analysis and also enables the lower tire/wheel natural frequencies to be measured in all three principal directions.

The present invention provides a tire testing machine having a frame which enables a tire/wheel assembly to be loaded and rolled on a simulated road surface with nearly zero stiffness boundary conditions. With particular reference to a curved simulated road surface (e.g., a road wheel), pre-loaders are provided to enable the tire/wheel assembly to be statically loaded onto the curved surface in a stable manner.

More particularly, the present invention provides a tire testing machine comprising a movable simulated road surface; an axle including a bearing surface around which a tire/wheel assembly can rotate; and a frame. The frame supports the axle in a non-rotatable but vertically floatable manner relative to the simulated road surface whereby the tire can be loaded in rolling engagement against the simulated road surface. To this end, the frame comprises tie members which extend from the axle to a stationary support in a geometrically sturdy arrangement and non-damping piston members which are interposed between the tie members and the stationary support. The simulated road surface can comprise the outer circumferential surface of a road wheel. "Geometrically sturdy" means that the connection of frame and tie members results in a substantially inflexible structure based on the geometry of the connections to dynamically isolate the road/wheel assembly from the remainder of the tire testing machine. Preferably, the geometrically sturdy arrangement is a triangular arrangement because of the minimal number of components. However, for a variety of reasons, it can be desirable to use a higher number of components in another geometrically sturdy arrangement such as multiple triangular, pentagonal, hexagonal, and octagonal arrangements, or combinations thereof. Also, a linear alignment of tie members may provide, in certain circumstances, a geometrically sturdy arrangement.

The piston members can be adjustable to initially set the load of the tire/wheel assembly (or preload the tire) against the movable simulated road surface. These piston members can comprise air pistons and more preferably frictionless zero-stiffness air pistons. The tie members can be connected to the air pistons via slides which are cushioned with air bearings to eliminate nearly all damping contribution from the slides. The preferred geometrical arrangement of the tie members is an isosceles triangular arrangement.

To test a tire/wheel assembly with the tire testing machine of the present invention, the tire/wheel assembly is rotatably mounted on the bearing surface of the axle and the tire is loaded into rolling engagement with the simulated road surface. The simulated road surface is then moved to rotate the tire/wheel assembly whereby test data can be obtained under substantially zero stiffness boundary conditions such as measurements of the lower tire/wheel natural frequencies in the three principal directions. This test data can then be modeled in various finite element analyses known to and used by those skilled in the art.

The present invention provides these and other features hereinafter fully described and particularly pointed out in the claims. The following description and drawings set forth, in detail, a certain illustrative embodiment of the invention. This embodiment is indicative, however, of but one of the various ways in which the principles of the invention can be employed.

DRAWINGS

DETAILED DESCRIPTION

Figure 1:
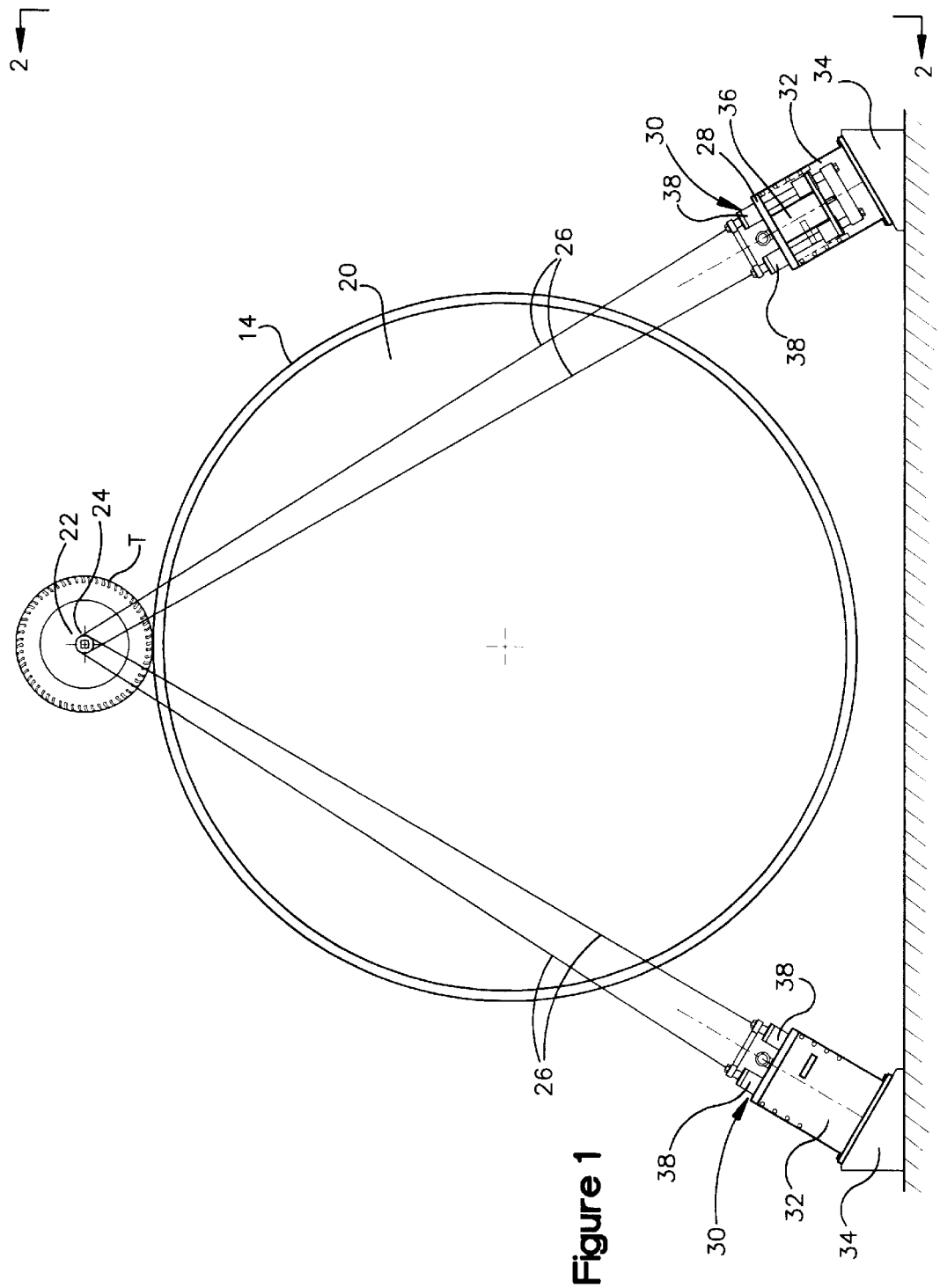
FIG. 1 is a front view of a tire testing machine according to the present invention.
Figure 2:
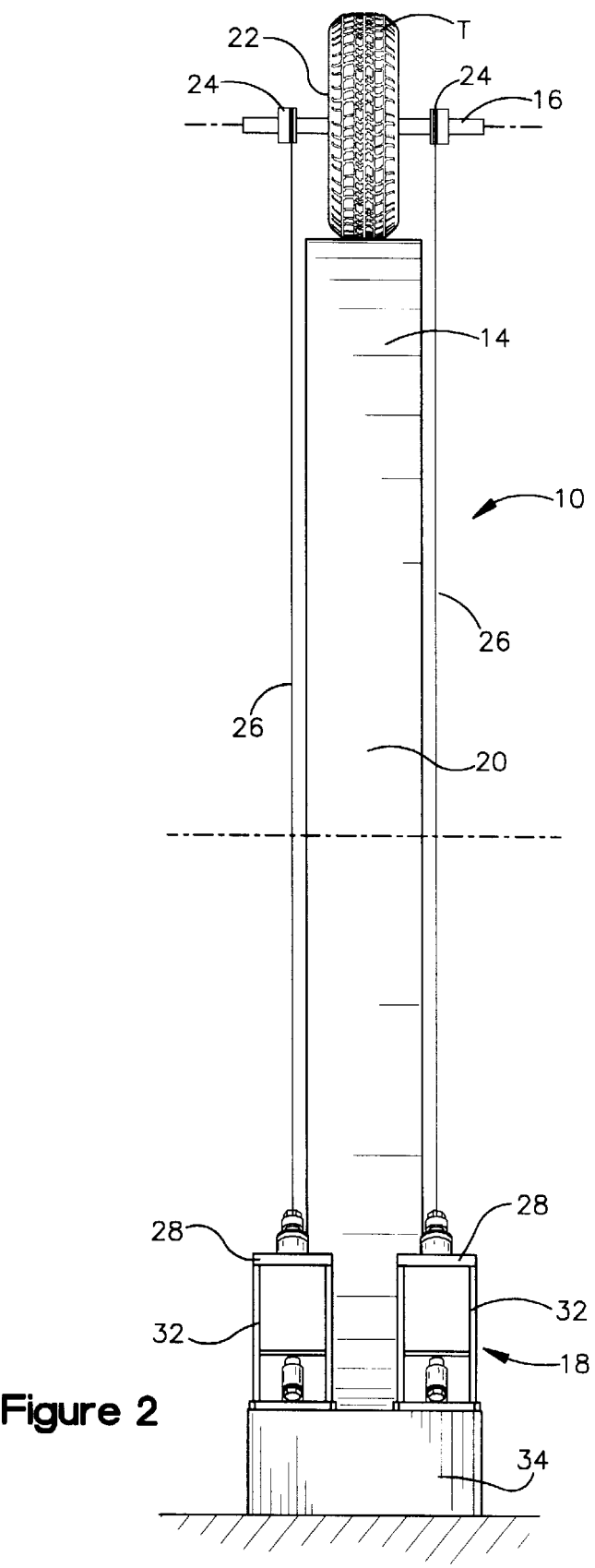
FIG. 2 is a side view of a tire testing machine according to the present invention.

Referring now to the drawings in detail, FIGS. 1 and 2 schematically show a tire-testing machine 10 according to the present invention for testing a tire/wheel assembly T. The tire testing machine 10 comprises a movable simulated road surface 14, an axle 16, and a frame 18 which supports the axle 16 relative to the simulated road surface 14.

In the illustrated embodiment, the simulated road surface 14 is the outer circumferential surface of a road wheel 20. Although not specifically shown in the drawings, the road wheel 20 includes an axle which is rotated by a motor. The road wheel motor can be a variable speed device so that the road wheel 20 can be set to rotate at a speed corresponding to the desired speed of the tire/wheel assembly T during testing procedures. The simulated road surface 14 can instead comprise a flat rather than curved surface, such as a movable belt or flat track.

The axle 16 includes a bearing surface 22 around which the tire/wheel assembly T can rotate. A pulley 24 is positioned on each lateral side of the axle 16 for coordination with the frame 18. Although not specifically shown in the drawings, lateral and fore/aft restraints (such as springs) can be provided to stabilize the tire/wheel assembly T relative to the road surface 14 during testing procedures.

The frame 18 supports the axle 16 in a non-rotatable but vertically floatable manner relative to the simulated road surface 14 whereby the tire/wheel assembly can be loaded in rolling engagement against the simulated road surface 14. The illustrated frame 18 comprises tie members 26, stationary support 28, and non-damping piston members 30 interposed between the tie members 26 and the stationary support 28.

The tie members 26 extend between the axle 14 and the stationary support 28 in a geometrically sturdy arrangement. In the illustrated embodiment, the tie members 26 are cables extending from the stationary support 28 to clamps 24 on the axle 14 and each cable includes an end coupled to one of the piston members 30. The illustrated triangular arrangement of the tie members 26 is an isosceles triangular arrangement. That being said, other geometrical sturdy arrangements (including other polygons and also linear arrangements) are possible with, and contemplated by, the present invention.

In the illustrated embodiment, the stationary support 28 comprises piston mounting brackets 32 secured to angular floor braces 34. The brackets 32 mount the piston members 30 at the desired angular orientation (60° from the horizontal in the illustrated embodiment). A stationary support with more or less braces/brackets, with different bracket/braces designs, or even with the ground itself being the stationary support is possible with, and contemplated by, the present invention.

In the illustrated embodiment, the piston members 30 comprise air pistons and more particularly air pistons 36 having zero-stiffness at low frequency motion and near zero stiffness at high frequency motion. Such a piston may be accomplished by providing a relatively large reservoir of pressurized air so that any differential movement of the piston is accomplished under approximately equal pressure conditions. The illustrated piston members 30 also each include a pair of slides 38 which are connected to, and move with, the air piston 36. The slides 38 are provided with air bearings to prevent the introduction of friction or damping from the slides. The ends of the cable 26 are secured to the slides 38 so that they linearly move with the rod of the air piston 36. By adjusting the air pressure in each of the air pistons 36, the tire/wheel assembly T can be loaded onto the simulated road surface 14 to a specified load.

To test a tire/wheel assembly with the tire testing machine 10 of the present invention, the tire/wheel assembly T is rotatably mounted on the bearing surface 22 of the axle 16 and the tire/wheel assembly T is loaded into rolling engagement with the simulated road surface 14. The simulated road surface 14 is then moved to rotate the tire/wheel assembly T whereby test data can be obtained under substantially zero stiffness boundary conditions such as measurements of the lower tire/wheel natural frequencies in the three principal directions. This test data can then be modeled in Finite Element Analyses.

One can now appreciate that the present invention provides a tire test machine 10 having a load frame 18 which enables a tire/wheel assembly to be loaded and rolled on a simulated road surface 14 with nearly zero stiffness boundary conditions. Although the invention has been shown and described with respect to a certain embodiment, it is obvious that equivalent alterations and modifications will occur to others skilled in the art upon the reading and understanding of this specification. The present invention includes all such alterations and modifications and moreover is limited only by the scope of the following claims.

What is claimed is:

1. A tire testing machine comprising:

a movable simulated road surface;

an axle including a bearing surface around which a tire/wheel assembly can rotate; and a frame which supports the axle in a non-rotatable but vertically floatable manner relative to the simulated road surface whereby the tire/wheel assembly can be loaded in rolling engagement against the simulated road surface;

wherein the frame comprises a plurality of tie members which extend from the axle to a stationary support in a geometrically sturdy arrangement and non-damping piston members which are interposed between each of the plurality of tie members and the stationary support.

2. A tire testing machine comprising:

a movable simulated road surface;

an axle including a bearing surface around which a tire/wheel assembly can rotate; and a frame which supports the axle in a non-rotatable but vertically floatable manner relative to the simulated road surface whereby the tire/wheel assembly can be loaded in rolling engagement against the simulated road surface;

wherein the frame comprises tie members which extend from the axle to a stationary support in a geometrically sturdy arrangement and non-damping piston members which are interposed between the tie members and the stationary support;

wherein the axle is positioned substantially horizontal and wherein the tie members are positioned in substantially vertical planes and wherein the geometrically sturdy arrangement is a triangular arrangement.

3. A tire testing machine as set forth in claim 2, wherein the triangular arrangement is an isosceles triangular arrangement.

4. A tire testing machine as set forth in claim 1, wherein each tie member includes an end coupled to one of the piston members.

5. A tire testing machine as set forth in claim 1, wherein the piston members are adjustable to initially set the load of the tire/wheel assembly against the movable simulated road surface.

6. A tire testing machine as set forth in claim 1, wherein the piston members are air pistons.

7. A tire testing machine comprising:

a movable simulated road surface;

an axle including a bearing surface around which a tire/wheel assembly can rotate; and a frame which supports the axle in a non-rotatable but vertically floatable manner relative to the simulated road surface whereby the tire/wheel assembly can be loaded in rolling engagement against the simulated road surface;

wherein the frame comprises tie members which extend from the axle to a stationary support in a geometrically sturdy arrangement and non-damping piston members which are interposed between the tie members and the stationary support;

wherein the piston members are air pistons; and wherein the pistons are frictionless nearly zero-stiffness air pistons.

8. A tire testing machine as set forth in claim 1, wherein the simulated road surface comprises the outer circumferential surface of a road wheel.

9. A tire testing machine comprising:

a movable simulated road surface;

an axle including a bearing surface around which a tire/wheel assembly can rotate; and a frame which supports the axle in a non-rotatable but vertically floatable manner relative to the simulated road surface whereby the tire/wheel assembly can be loaded in rolling engagement against the simulated road surface;

wherein the frame comprises tie members which extend from the axle to a stationary support in a geometrically sturdy arrangement and non-damping piston members which are interposed between the tie members and the stationary support;

wherein the simulated road surface comprises the outer circumferential surface of a road wheel; and wherein two tie members extend in an isosceles triangular arrangement from both lateral sides of the axle and each tie member includes a first end coupled to one of the piston members and another end coupled to another one of the piston members.

10. A tire testing machine as set forth in claim 9, wherein the piston members are adjustable to initially set the load of the tire/wheel assembly against the movable simulated road surface.

11. A tire testing machine as set forth in claim 10, wherein piston members each comprise an air piston.

12. A tire testing machine comprising:

a movable simulated road surface;

an axle including a bearing surface around which a tire/wheel assembly can rotate; and a frame which supports the axle in a non-rotatable but vertically floatable manner relative to the simulated road surface whereby the tire/wheel assembly can be loaded in rolling engagement against the simulated road surface;

wherein the frame comprises tie members which extend from the axle to a stationary support in a geometrically sturdy arrangement and non-damping piston members which are interposed between the tie members and the stationary support;

wherein the simulated road surface comprises the outer circumferential surface of a road wheel;

wherein two tie members extend in an isosceles triangular arrangement from both lateral sides of the axle and each tie member includes a first end coupled to one of the piston members and another end coupled to another one of the piston members;

wherein the piston members are adjustable to initially set the load of the tire/wheel assembly against the movable simulated road surface;

wherein the piston members each comprise an air piston; and wherein the air pistons are frictionless nearly zero-stiffness air pistons.

13. A tire testing machine as set forth in claim 12, wherein the piston members each include a pair of slides which are connected to, and move with, the air piston.

14. A method of testing a tire/wheel assembly, comprising the steps of:

rotatably mounting the tire/wheel assembly on the bearing surface of the axle of the tire testing machine of claim 1;

loading the tire/wheel assembly into rolling engagement with the simulated road surface.

moving the simulated road surface.

15. A method as set forth in claim 14, further comprising the step of adjusting the piston members to preload the tire/wheel assembly against the simulated road surface.

16. A method of testing a tire/wheel assembly comprising the steps of:

rotatably mounting the tire/wheel assembly on a tire testing machine comprising a movable simulated road surface, an axle including a bearing surface on which the tire/wheel assembly is rotatably mounted, a frame which supports the axle in a non-rotatable but vertically floatable manner relative to the simulated road surface whereby the tire/wheel assembly can be loaded in rolling engagement against the simulated road surface, wherein the frame comprises tie members which extend from the axle to a stationary support in a geometrically sturdy arrangement and non-damping piston members which are interposed between the tie members and the stationary support;

loading the tire/wheel assembly into rolling engagement with the simulated road surface;

moving the simulated road surface; and obtaining test data under substantially zero stiffness boundary conditions.

17. A method as set forth in claim 16, wherein the test data comprises measurements of the lower tire/wheel natural frequencies in the three principal directions.

18. A method as set forth in claim 14, further comprising the step of modeling the test data using Finite Element Analysis.

* * * * *